No. 657,565. Patented Sept. 11, 1900.
A. G. RAMAGE & G. MACMILLAN.
WHEEL.
(Application filed Feb. 5, 1900.)
(No Model.)

Witnesses
E. A. Ballock
A. M. Parkins

Inventors
Alexander G. Ramage and
George Macmillan
By their Attorneys
Baldwin, Davidson & Wight

UNITED STATES PATENT OFFICE.

ALEXANDER GULLILAND RAMAGE, OF LEITH, AND GEORGE MACMILLAN, OF EDINBURGH, SCOTLAND.

WHEEL.

SPECIFICATION forming part of Letters Patent No. 657,565, dated September 11, 1900.

Application filed February 5, 1900. Serial No. 4,058. (No model.)

*To all whom it may concern:*

Be it known that we, ALEXANDER GULLILAND RAMAGE, ship-builder, residing at 9 Derby street, Leith, and GEORGE MACMILLAN, merchant, residing at 93 George street, Edinburgh, Scotland, subjects of the Queen of Great Britain, have invented a certain new and useful Wheel, of which the following is a specification.

This invention relates to elastic wheels for vehicles.

The wheel consists of a hub having short spokes projecting outward from it, a rim having short spokes projecting inward from it, springs, preferably in extension, interposed between the ends of the spokes of the two sets, and pairs of tie-rods connecting the outer end of each spoke on the rim to the inner ends of the two adjacent spokes, the tie-rods of each pair preferably crossing one another. These tie-rods may either be fixed directly to the outer ends of the spokes or to the adjacent part of the rim.

Figure 2:
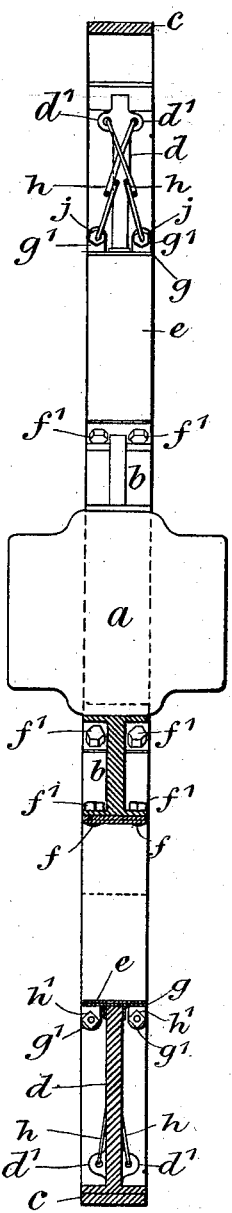
Figure 1:
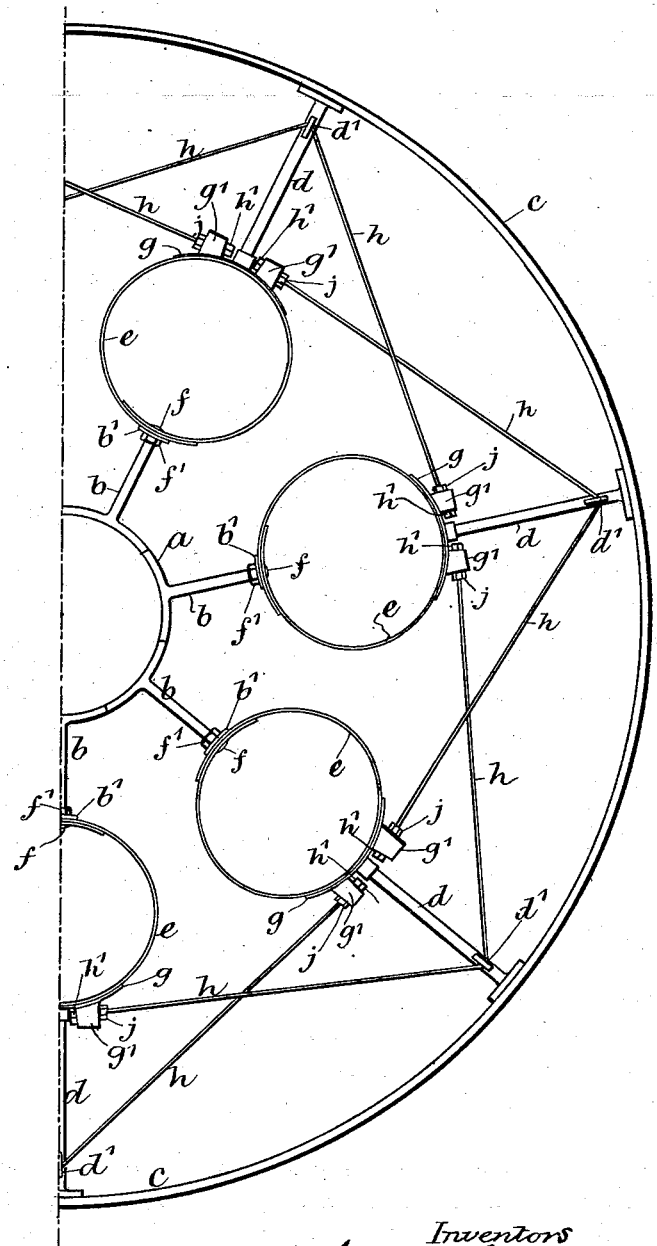

Figure 1 is a half side elevation of a wheel constructed according to this invention, and Fig. 2 is a central vertical section.

$a$ is the hub, having spokes $b$ projecting outward from it.

$c$ is the rim, having spokes $d$ projecting inward from it. The ends of the spokes $b$ have flanges $b'$, to which springs $e$ are fixed by bolts $f$ and nuts $f'$. The springs $e$ are preferably so tempered that they are extended radially to the wheel when in place. The ends of the spokes $d$ carry plates $g$, having on them lugs $g'$. The springs $e$ are connected to the plates $g$ by bolts and nuts or rivets, which are not shown.

$h$ represents tie-rods connected to lugs $d'$ on the outer ends of the spokes $d$, or to the rim, and to the lugs $g'$ on their inner ends.

$h'$ represents nuts by which the tie-rods $h$ are tightened.

$j$ represents jam-nuts.

What we claim is—

1. The combination of a hub, short spokes projecting outward from the hub, a rim, short spokes projecting inward from the rim, springs interposed between the ends of the spokes of the two sets, and pairs of tie-bars connecting the outer end of each spoke on the rim to the inner ends of the two adjacent spokes.

2. The combination of a hub, short spokes projecting outward from the hub, a rim, short spokes projecting inward from the rim, approximately-circular springs interposed between the ends of the spokes of the two sets and pairs of tie-bars connecting the outer end of each spoke on the rim to the inner ends of the two adjacent spokes.

3. The combination of a hub, short spokes projecting outward from the hub, a rim, short spokes projecting inward from the rim, springs extended radially to the wheel interposed between the ends of the spokes of the two sets, and pairs of tie-bars connecting the outer end of each spoke on the rim to the inner ends of the two adjacent spokes.

4. The combination of a hub, short spokes projecting outward from the hub, a rim, short spokes projecting inward from the rim, approximately-circular springs extended radially to the wheel interposed between the ends of the spokes of the two sets and pairs of tie-bars connecting the outer end of each spoke on the rim to the inner ends of the two adjacent spokes.

ALEXANDER GULLILAND RAMAGE.
   GEORGE MACMILLAN.

Witnesses:
 R. B. RANSFORD,
 JOHN H. WHITEHEAD.